United States Patent
Nguyen et al.

(10) Patent No.: US 9,699,707 B2
(45) Date of Patent: Jul. 4, 2017

(54) CALCULATION METHODS AND CALCULATION DEVICES

(71) Applicant: Kabushiki Kaisha Toshiba, Minato-ku (JP)

(72) Inventors: Cam Ly Nguyen, Yokohama (JP); Hiroyuki Kitagawa, Yokohama (JP); Tatsuma Hirano, Chiyoda (JP); Ren Sakata, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 203 days.

(21) Appl. No.: 14/583,922

(22) Filed: Dec. 29, 2014

(65) Prior Publication Data

US 2015/0195728 A1 Jul. 9, 2015

(30) Foreign Application Priority Data

Jan. 6, 2014 (JP) ................................ 2014-000379

(51) Int. Cl.
*H04W 16/18* (2009.01)
*H04W 40/02* (2009.01)
(Continued)

(52) U.S. Cl.
CPC ........... *H04W 40/02* (2013.01); *H04W 16/18* (2013.01); *H04W 24/08* (2013.01); *H04L 45/20* (2013.01)

(58) Field of Classification Search
CPC ..... H04W 16/18; H04W 24/08; H04W 40/02; H04L 45/20
See application file for complete search history.

(56) References Cited

U.S. PATENT DOCUMENTS

| 8,867,985 B2* | 10/2014 | Yang | H04W 40/22 455/11.1 |
| 2011/0039594 A1* | 2/2011 | Liu | H04W 48/02 455/515 |
| 2016/0021007 A1* | 1/2016 | Shuman | H04L 47/12 370/235 |

FOREIGN PATENT DOCUMENTS

| JP | 2015-12495 A | 1/2015 |
| WO | WO 2011142689 A1 * | 11/2011 ............ H04M 15/50 |

OTHER PUBLICATIONS

Khan, A, and Jun S. A New Handoff Ordering and Reduction Scheme Based on Road Topology Information*. Wireless Communications, Networking and Mobile Computing [online], 2006 [retrieved on Nov. 9, 2016]. WiCOM 2006. Retrieved from the Internet: <URL: http://ieeexplore.ieee.org/stamp/stamp.jsp?arnumber=4149537>.*

(Continued)

*Primary Examiner* — Omar Ghowrwal
(74) *Attorney, Agent, or Firm* — Oblon, McClelland, Maier & Neustadt, L.L.P.

(57) ABSTRACT

According to an embodiment, a calculation method is for performing calculation on a wireless network including multiple terminals and multiple base stations. The method includes calculating a first probability with which a first base station and a second terminal are capable of connection with (h−1) hops, h being a finite integer equal to or larger than 2, and a first terminal and the second terminal are capable of direct connection with each other, by using a probability with which the first terminal and the second terminal are capable of direct connection with each other and a probability with which the second terminal and the first base station are capable of direct connection with each other; and calculating a second probability with which the first terminal (Continued)

is capable of connection with at least one of the base stations with h hops by using the first probability.

10 Claims, 7 Drawing Sheets

(51) Int. Cl.
*H04W 24/08* (2009.01)
*H04L 12/733* (2013.01)

(56) References Cited

OTHER PUBLICATIONS

Ramesh Rajagopalan, et al., "Connectivity Analysis of Wireless Sensor Networks with Regular Topologies in the Presence of Channel Fading" IEEE Transactions on Wireless Communications, vol. 8, No. 7, Jul. 2009, pp. 3475-3483.
Justin P. Coon, et al., "On the Connectivity of 2-D Random Networks with Anisotropically Radiating Nodes" IEEE Communications Letters, vol. 17, No. 2, Feb. 2013, pp. 321-324.

* cited by examiner

FIG.1

● TERMINAL (Sj)
▲ BASE STATION (Bi)

FIG.2

● NODE
— DIRECT CONNECTION

FIG.3

• NODE
— DIRECT CONNECTION

FIG.4

• TERMINAL
▲ BASE STATION
— DIRECT CONNECTION

CALCULATION METHODS AND CALCULATION DEVICES

CROSS-REFERENCE TO RELATED APPLICATIONS

This application is based upon and claims the benefit of priority from Japanese Patent Application No. 2014-000379, filed on Jan. 6, 2014; the entire contents of which are incorporated herein by reference.

FIELD

Embodiments described herein relate generally to a calculation method and a calculation device.

BACKGROUND

Wireless networks in which a base station and a plurality of wireless terminals spread spatially communicate with one another and in which each wireless terminal is capable of communicating with a base station via other wireless terminals are known. Such a wireless network in which communication is carried out via other wireless terminals is referred to as a multihop wireless network, and each wireless terminal in a multihop wireless network is referred to as a node. For such a multihop wireless network, a method of evaluating the network by calculating a probability with which any two nodes are capable of wireless communication with each other is known.

In a multihop wireless network, the hop count may be limited owing to communication delay time and the like taken into consideration. In related art, there has been provided no calculation method for evaluating a network on the basis of a probability with which two nodes are capable of wireless communication in such a case in which the hop count is limited.

DETAILED DESCRIPTION

According to an embodiment, a calculation method is for performing calculation on a wireless network including a plurality of terminals and a plurality of base stations. The terminals includes a first terminal and the second terminal. The base stations includes a first base station. The method includes calculating a first probability with which the first base station and the second terminal are capable of connection with (h−1) hops, h being a finite integer equal to or larger than 2, and the first terminal and the second terminal are capable of direct connection with each other, by using a probability with which the first terminal and the second terminal are capable of direct connection with each other and a probability with which the second terminal and the first base station are capable of direct connection with each other; and calculating a second probability with which the first terminal is capable of connection with at least one of the base stations with h hops by using the first probability.

Exemplary embodiments according to the present invention will be described below. First, before description of embodiments, a network configuration applicable to the embodiments will be schematically described with reference to FIG. 1.

Network System Applicable to Embodiments

Figure 1:
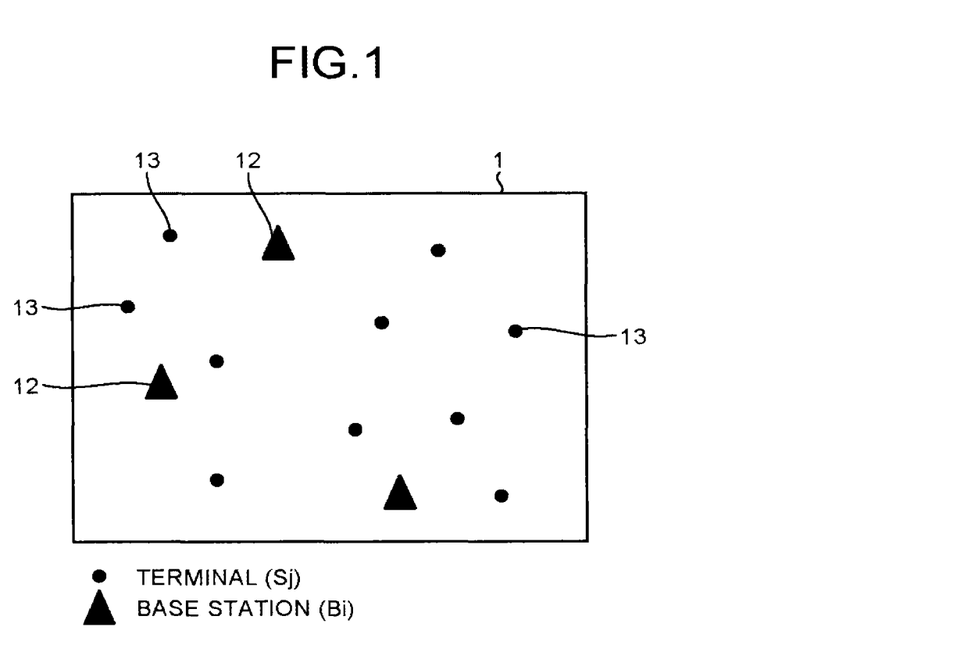
FIG. 1 is a diagram explaining a network configuration applicable to respective embodiments.

In FIG. 1, the network system 1 includes one or more base stations 12, and one or more terminals 13 that communicate with the base stations 12 through wireless communication. The terminals 13 are radio transceivers, wireless sensor nodes, or wireless terminals of user, for example. The base stations 12 are radio access points or concentrators, for example.

In the following, the network system 1 is assumed to include m (m is an integer not smaller than 1) base stations 12 and n (n is an integer not smaller than 1) terminals 13. The m base stations 12 and n terminals 13 included in the network system 1 are nodes for communication in the network system 1. In the following, each of the base stations 12 will be referred to as a base station Bi using a variable i (i is an integer; 1≤i≤m), and each of the terminals 13 will be referred to as a terminal Sj using a variable j (j is an integer; 1≤j≤n).

In the network system 1, the terminals 13 can mutually communicate wirelessly and some terminals 13 can communicate wirelessly with base stations 12 via one or more other terminals 13. It is assumed here that a value h is an integer not smaller than 2, and a first terminal 13 that can connect with a base station 12 via up to (h−1) other terminals 13 will be referred to as a terminal 13 capable of h connections. The value h will be referred to as a hop count h.

When a first terminal 13 can be directly connected with a second terminal 13 via no other terminals 13, the first terminal 13 and the second terminal will be referred to as being capable of direct connection, and the connection between the first terminal 13 and the second terminal 13 will be referred to as direct connection. Similarly, when a first terminal 13 can be directly connected with a base station 12 via no other terminals 13, the first terminal 13 and the base station 12 will also be referred to as being capable of direct connection.

Figure 2:
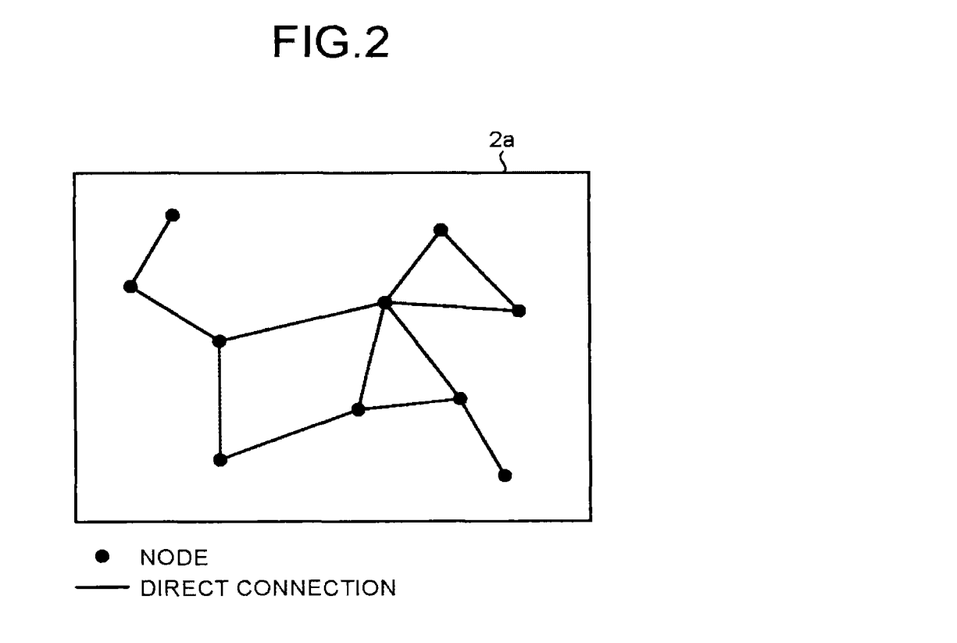
FIG. 2 is a diagram for explaining the connectivity of a network system.
Figure 3:
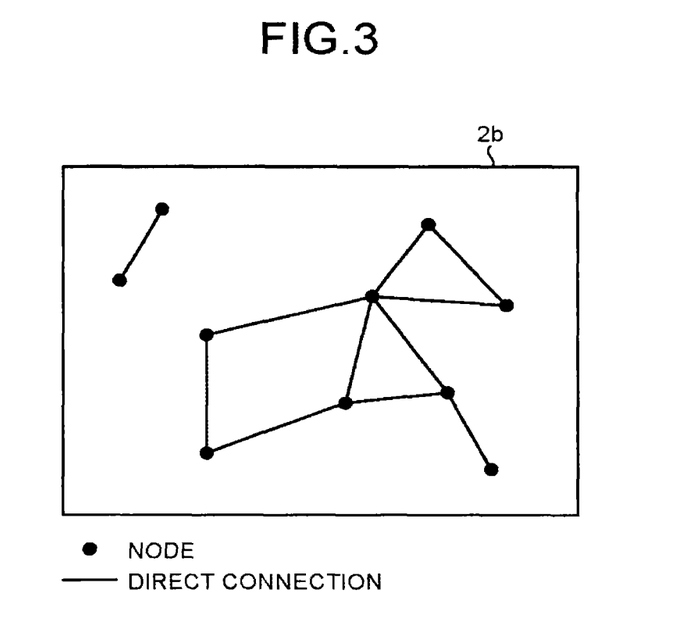
FIG. 3 is a diagram for explaining the connectivity of the network system.

Here, the connectivity of a network system will be schematically described with reference to FIGS. 2 and 3. In FIGS. 2 and 3, "● (black dots)" represent nodes, and lines connecting nodes indicate that the nodes are capable of direct connection with each other.

FIG. 2 illustrates an example of a network system 2a in which certain two nodes are capable of direct connection with each other. Such a network system 2a will be referred to as a "connected network". In the connected network, a certain terminal included in the network system can communicate with at least one base station via up to (h−1) intermediate terminals, h being a given positive integer. FIG. 3 illustrates an example of a network system 2b including nodes that are not capable of direct connection with each other. Such a network system 2b will be referred to as an "unconnected network". The unconnected network is assumed to have lower connectivity than the connected network.

Figure 4:
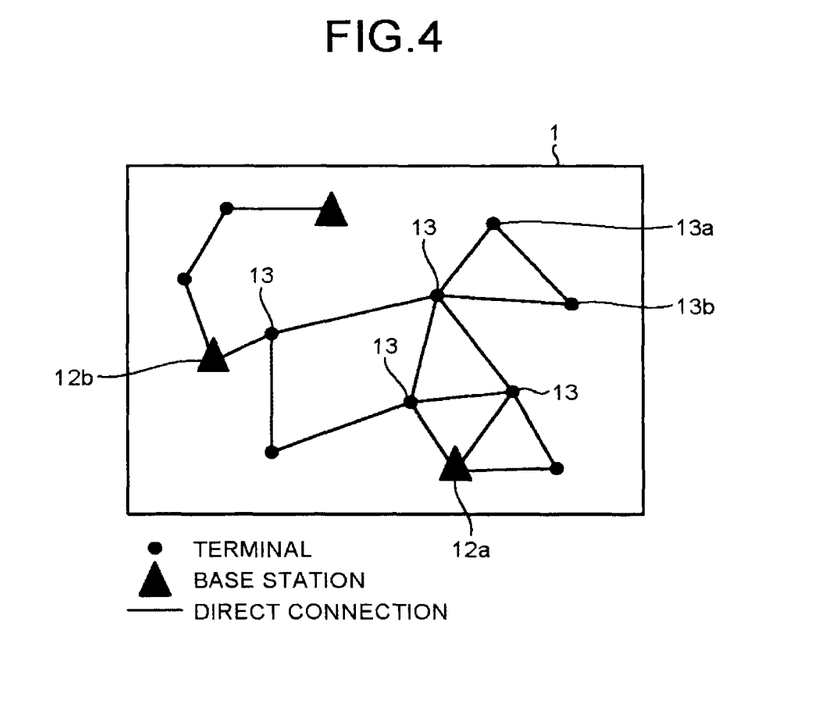
FIG. 4 is a diagram illustrating a network system in which examples of communication paths that can be directly connected are added.

FIG. 4 illustrates an example in which communication paths that can be directly connected are added to the network system 1 of FIG. 1 described above. The network system 1 illustrated in FIG. 4 is a connected network if the hop count h is 3 or an unconnected network if the hop count h is 2. This is because terminals 13a and 13b, for example, in FIG. 4 need to use two or more terminals 13 to communicate with a base station 12a or a base station 12b.

First Embodiment

Next, a method for calculating a probability of connection in a communication network according to the first embodiment will be described. In calculation methods presented in the embodiments described below, a probability $P^h$ with which each of the terminals 13 included in the network system 1 is capable of h connections with at least one of all the base stations 12 included in the network system 1 when a maximum hop count of h is given is calculated. Users can evaluate the network system 1 by using the probability $P^h$. In the embodiments described below, the probability $P^h$ is calculated on the basis of the probability (hereinafter referred to as the probability of direct connection where appropriate) with which direct connections between nodes are possible.

For easier understanding of the following procedures, direct connections between nodes are represented by matrices $C^1$ and A expressed by the following Equations (1) and (2).

$$C^1 = (P^1_{Bi,Sj}) \qquad (1)$$

$$A = (P^1_{Sj,Sj}) \qquad (2)$$

The matrix $C^1$ expressed by Equation (1) is a matrix of m rows×n columns representing the probability of direct connection between each terminal 13 and each base station 12. An element at the i-th row and the j-th column of the matrix $C^1$ is represented by a value $P^1_{Bi,Sj}$. Thus, the value $P^1_{Bi,Sj}$ represents the probability of direct connection between a base station Bi and a terminal Sj. Hereinafter, the value $P^1_{Bi,Sj}$ will be referred to as a probability $P^1_{Bi,Sj}$.

The matrix A expressed by Equation (2) is a matrix of n rows×n columns representing the probability of direct connection between terminals 13. An element at the i-th row and the j-th column of the matrix A is represented by a value $P^1_{Si,Sj}$ similarly to the above. Thus, the value $P^1_{Si,Sj}$ represents the probability of direct connection between a terminal Si and a terminal Sj. Note that the probability $P^1_{Sj,Sj}$ is 1.

Figure 5:
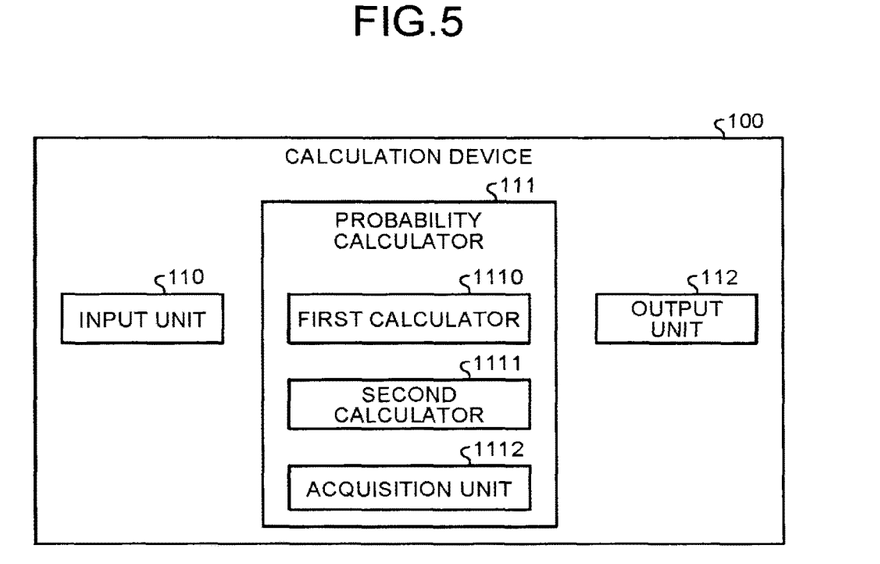
FIG. 5 is a functional block diagram illustrating functions of a calculation device applicable to a first embodiment.

FIG. 5 is a functional block diagram illustrating functions of a calculation device 100 applicable to the first embodiment. In FIG. 5, the calculation device 100 includes an input unit 110, a probability calculator 111, and an output unit 112.

The input unit 110 receives as input various data necessary for probability calculation in the probability calculator 111. The probability calculator 111 includes a first calculator 1110 and a second calculator 1111 configured to perform predetermined first and second calculations, respectively, and an acquisition unit 1112 configured to acquire information used in the first calculator 1110 and the second calculator 1111. The probability calculator 111 acquires information at the acquisition unit 1112 on the basis of various data input to the input unit 110, and performs calculations, which will be described later, at the first calculator 1110 and the second calculator 1111 to obtain the aforementioned probability $P^h$.

The output unit 112 outputs the probability $P^h$ calculated by the probability calculator 111 to the outside. The output unit 112 can directly output the probability $P^h$. Alternatively, the output unit 112 may calculate an evaluation value for evaluating the network system 1 on the basis of the probability $P^h$ by a method to be described later, and output the calculated evaluation value. The output unit 112 may also include a display to display the probability $P^h$ and the evaluation value.

In the calculation device 100, the probability calculator 111 is implemented by a calculation program running on a central processing unit (CPU). Alternatively, the probability calculator 111 may be implemented by hardware. The calculation program for implementing the probability calculator 111 may include at least one or more of the functions of the input unit 110 and the output unit 112.

Figure 6:
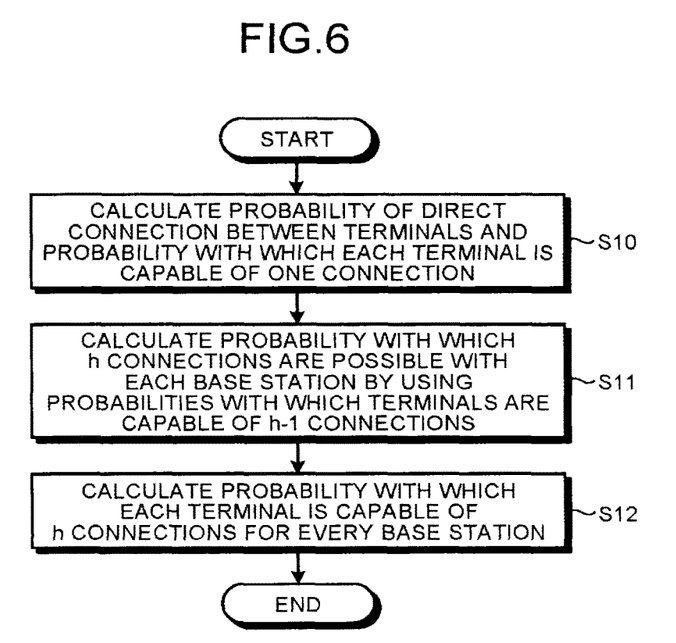
FIG. 6 is an exemplary flowchart illustrating calculation procedures according to the first embodiment.

FIG. 6 is an exemplary flowchart illustrating calculation procedures executed by the probability calculator 111 of the calculation device 100 according to the first embodiment. It is assumed that a maximum hop count h is given to the probability calculator 111 before execution of the flowchart.

In step S10, the acquisition unit 1112 acquires the probability of direct connection between terminals 13 and the probability with which one connection is possible between each terminal 13 and each base station 12 included in the network system 1 on the basis of data input to the input unit 110. Note that a terminal 13 and a base station 12 being capable of one connection means that the terminal 13 and the base station 12 can be directly connected. Specifically, the acquisition unit 1112 acquires the probability of direct connection between nodes included in the network system 1 in step S10.

Subsequently, in step S11, the first calculator 1110 uses the probabilities of direct connection acquired by the acquisition unit 1112 in step S10 and uses the probabilities with which each terminal 13 is capable of (h−1) connections to calculate a first probability with which each terminal 13 is capable of h connections with each base station 12. As will be described later, the probability with which each terminal 13 is capable of (h−1) connections can be obtained by repeating calculation with the hop count being incremented by 1 until the hop count h becomes (h−1) starting from the probability when the hop count h is 2.

Subsequently, in step S12, the second calculator 1111 calculates a second probability with which each terminal 13 can connect with at least one of all the base stations 12 included in the network system 1 by using the first probability calculated in step S11. The output unit 112 outputs the second probabilities calculated for the respective terminals 13.

Next, the respective steps of the flowchart in FIG. 6 will be described in more detail. A known method can be applied to the method for acquiring the probability of direct connection between nodes in step S10. Examples of the method for acquiring the probability of direct connection between nodes will be presented in the following (i) to (iii).

(i) A first example is a method applicable when the positions the nodes and the distances the nodes can communicate are known. Specifically, in the first example, the acquisition unit 1112 obtains a distance between certain two nodes included in a plurality of nodes included in the network system 1, and determines whether or not the obtained distance is within the distance the two nodes can mutually communicate. If the distance between the two nodes is determined to be within the distance the two nodes can mutually communicate, the acquisition unit 1112 sets the probability of direct connection between the two nodes to 1. If the distance between the two nodes is determined to exceed the distance the two nodes can mutually communicate, the acquisition unit 1112 sets the probability of direct connection between the two nodes to 0.

(ii) A second example is a method applicable when the positions of the nodes and the distances the nodes can communicate are unknown but the signal to noise ratios (SNRs) in communication between nodes are known. For example, assume that each node has a function of measuring the SNR in communication from another node. In this case, if the SNR of a node with another node is equal to or larger than a predetermined threshold, the acquisition unit 1112 sets the probability of direct connection between the two nodes to 1. If the SNR is smaller than the threshold, the acquisition unit 1112 sets the probability of direct connection between the two nodes to 0.

Figure 7:
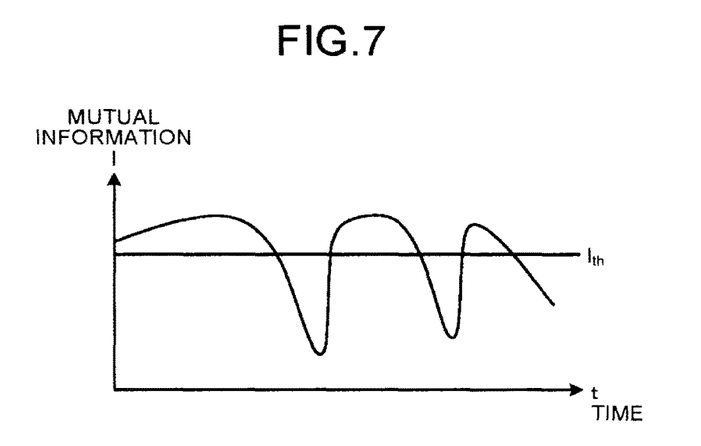
FIG. 7 is a graph illustrating variation of mutual information I between two nodes with time t.

(iii) A third example is a method applicable when mutual information in communication between nodes may vary with time in a fading environment. FIG. 7 illustrates an example of variation of mutual information I with time t during communication between two nodes at fixed positions. When the mutual information I may vary with time t in this manner and if the mutual information I is smaller than a threshold $I_{th}$, a transmitted signal cannot be restored at the receiving side and communication is thus deemed to be disabled. It is therefore assumed that the probability of direct connection between nodes is the probability with which the mutual information is equal to or larger than the threshold $I_{th}$. In the third example, the probability of direct connection between nodes is obtained to be a value in a range of 0 or larger and 1 or smaller.

J. P. Coon et. al., "On the connectivity of 2-D random networks with anisotropically radiating nodes", IEEE communications letters, vol. 17, no. 2, February 2013 discloses some equations including the following Equation (3) to calculate such a probability P of direct connection between nodes in a fading environment.

$$P = P(\log_2(1 + SNR \cdot X) > I_{th}) = F_x\left(\frac{2^{I_{th}} - 1}{SNR}\right) \quad (3)$$

In Equation (3), variables represent the following. In the following, a variable X is a value that randomly changes according to probability density distribution thereof owing to fading, multipath, shadowing, interference, and the like.

$I_{th}$: threshold of mutual information;
X: random variable representing variation of radio channel; and
$F_x$: complementary cumulative distribution function (CCDF) of variable.
SNR: Signal to Noise Ratio The acquisition unit 1112 acquires the SNR measured between nodes as described above, for example.

Alternatively, the acquisition unit 1112 may acquire the SNR calculated on the basis of a distance between nodes. The following Equation (4) represents an example of the calculation of the SNR. In Equation (4), a value α represents a constant, a value η represents an attenuation constant, and a value d represents a distance between nodes.

$$SNR = \alpha \cdot d^{-\eta} \quad (4)$$

The probability P of direct connection between nodes described above is calculated outside in advance, input to the input unit 110 of the calculation device 100, and acquired by the acquisition unit 1112. Alternatively, the probability P of direct connection may be calculated and acquired by the acquisition unit 1112. In this case, data necessary for calculating the probability P of direct connection are input to the input unit 110.

The method for calculating the first probability in step S11 of FIG. 6 will be described. In the probability calculator 111, the first calculator 1110 calculates the first probability by using the probability of direct connection between nodes acquired by the acquisition unit 1112 in step S10. In this process, the first calculator 1110 calculates the connection probability (referred to as h connection probability) with which h connections are possible by using the probabilities with which respective terminals 13 are capable of (h−1) connections for each base station 12.

The matrix $C^1$ expressed by Equation (1) represents the connection probability with which each terminal 13 is capable of one connection with each base station 12 among the base stations 12 and the terminals 13 included in the network system 1. Specifically, in the matrix $C^1$, the probability with which a terminal Sj can connect to a base station Bi is represented by an element $P^1_{Bi,Sj}$ on the i-th row, the j-th column of the matrix $C^1$. Similarly, a matrix $C^{h-1}$ expressed by the following Equation (5) represents the probability with which each terminal 13 is capable of (h−1) connections with each base station 12.

$$C^{h-1} = (P^{h-1}_{Bi,Sj}) \quad (5)$$

Figure 8:
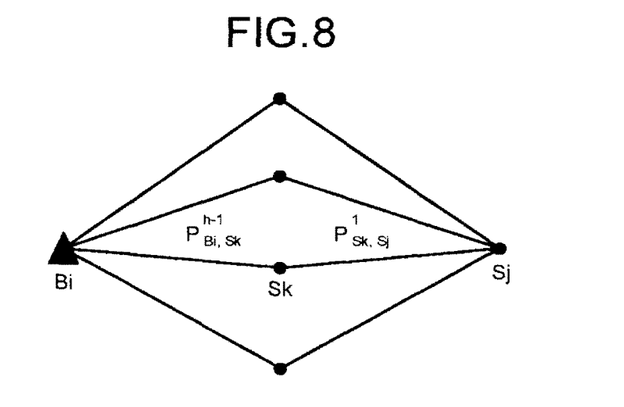
FIG. 8 is a diagram for explaining a method for calculating elements $P^h_{Bi,Sj}$ of a matrix $C^h$ according to the first embodiment.

A method for calculating each element $P^h_{Bi,Sj}$ of the matrix $C^h$ according to the first embodiment will be described below with reference to FIG. 8. Here, assume a terminal Sk (1≤k≤n) that is used for communication between a base station Bi and a terminal Sj and capable of direct connection with the terminal Sj. The terminals Sj and Sk can be any different terminals 13 selected from the terminals 13 included in the network system 1.

Note that the connection probability with which h connections are possible between the base station Bi and the terminal Sj when the terminal Sk is passed through is expressed by a product of a probability $P^{h-1}_{Bi,Sk}$ of (h−1) connections between the base station Bi and the terminal Sk and a probability $P^1_{Sk,Sj}$ of one connection between the terminal Sk and the terminal Sj as expressed by the following Expression (6).

$$P^{h-1}_{Bi,Sk} P^1_{Sk,Sj} \quad (6)$$

In contrast, a non-connection probability that is a probability with which the base station Bi and the terminal Sj cannot connect with each other is a probability with which the base station Bi and the terminal Sj cannot connect with each other even if the terminal Sk to be passed through is selected from all the terminals 13 included in the network system 1 excluding the terminal Sj. Specifically, the probability of non-connection between the base station Bi and the terminal Sj is expressed by the following Expression (7) using the probability of connection between the base station Bi and the terminal Sj expressed by Expression (6).

$$\prod_{1 \le k \le n} (1 - P_{Bi,Sk}^{h-1} \cdot P_{Sk,Sj}^{1}) \qquad (7)$$

Thus, from Expression (7), a probability $P^h_{Bi,Sj}$ representing the probability of h connections between the base station Bi and the terminal Sj can be calculated by the following Equation (8).

$$P_{Bi,Sj}^{h} = 1 - \prod_{1 \le k \le n} (1 - P_{Bi,Sk}^{h-1} \cdot P_{Sk,Sj}^{1}) \qquad (8)$$

Figure 9:
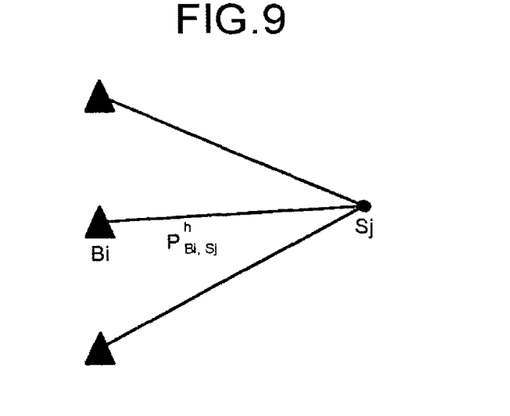
FIG. 9 is a diagram for explaining a method for calculating a second probability according to the first embodiment.

A method for calculating the second probability in step S12 of FIG. 6 will be described. In the probability calculator ill, the second calculator 1111 calculates the second probability by using the probability $P^h_{Bi,Sj}$ calculated by the first calculator 1110 in step S11. Specifically, the second calculator 1111 calculates, for each of the terminals 13 included in the network system 1, the probability with which the terminal 13 can connect with at least one base station 12 of all the base stations 12, that is m (m≥2) base stations 12 included in the network system 1 with a maximum hop count h as illustrated in FIG. 9.

More specifically, the probability of non-connection of the terminal Sj with all the base stations 12 included in the network system 1 is expressed by the following Expression (9). Thus, the probability $P^h_{Sj}$ with which the terminal Sj can connect with at least one of all the base stations 12 included in the network system 1 can be calculated by the following Equation (10).

$$\prod_{1 \le l \le m} (1 - P_{Bl,Sj}^{h}) \qquad (9)$$

$$P_{Sj}^{h} = 1 - \prod_{1 \le l \le m} (1 - P_{Bl,Sj}^{h}) \qquad (10)$$

These calculations are performed using the hop count h incremented one by one from a hop count h=2 until the hop count h reaches the given maximum hop count. As a result, the probability $P^h_{Sj}$ with which each of the terminals 13 included in the network system 1 can connect with at least one of the base stations 12 included in the network system 1 through the maximum hop count h is calculated.

Note that the probability of (h−1) connections to be used in step S11 described above can be obtained by using the connection probability $P^h_{Bi,Sk}$ when the hop count h is 2 and sequentially increasing the hop count h, for example.

Application

Next, an application of the first embodiment will be described. In the application, the connectivity of the network system 1 is evaluated by using the probability $P^h_{Sj}$ obtained in the first embodiment.

Referring to FIG. 1, assume the network system 1 including a plurality of terminals 13 and base stations 12. Each terminal 13 transmits packets to a base station 12 via terminals 13 with the maximum hop count h. In this case, a transmitted packet may be received by any of the base stations 12. The probability (probability $P^h_{Sj}$) with which a packet transmitted from a certain terminal 13 is received by at least one base station 12 can be calculated by Equation (10) described above. As the probability $P^h_{Sj}$ is higher, the network connectivity, that is the reliability, of the network system 1 is higher. The network connectivity can thus be evaluated by using the probability $P^h_{Sj}$.

A first example and a second example of the method for evaluating a network by using the probability $P^h_{Sj}$ will be described below.

The first example of the method for evaluating a network is an example in which the connectivity of a network is expressed by the smallest value of the probability $P^h_{Sj}$. Specifically, in the first example, an evaluation value CN is obtained according to the following Equation (11) to evaluate the network connectivity.

$$CN = \min_{1 \le j \le n} P_{Sj}^{h} \qquad (11)$$

The second example of the method for evaluating a network is an example in which the connectivity of a network is expressed by a probability with which each of all the terminals 13 included in the network system 1 can connect with at least one of the base stations 12 included in the network system 1. Specifically, in this second example, an evaluation value CN is obtained according to the following Equation (12) to evaluate the network connectivity.

$$CN = \prod_{1 \le j \le n} P_{Sj}^{h} \qquad (12)$$

For example, in the calculation device 100, the output unit 112 calculates Equation (11) or Equation (12) by using the probability $P^h_{Sj}$ output from the probability calculator 111, and outputs the evaluation value CN. Alternatively, the output unit 112 may output the probability $P^h_{Sj}$ output from the probability calculator 111 to the outside, and the evaluation value CN may be calculated in an external information processing device, for example.

Effects of the First Embodiment

Effects of the first embodiment will be described. R. Rajapopalan et. al., "Connectivity analysis of wireless sensor networks with regular topologies in the presence of channel fading", IEEE transactions on wireless communications, vol. 8, no. 7, pp. 3475-3483 July 2009 (hereinafter, referred to "Rajapopalan's analysis") proposes a method for calculating a probability with which a route is present between any two nodes in a network in which nodes are at random positions. In the Rajapopalan's analysis, however, the hop count, that is, the number of intermediate nodes is not considered, and it is therefore difficult to apply this method to a network system with a limited hop count.

For example, in a network system in which communication delay time is limited, a condition under which a node A and a node B can communicate with each other may be a hop count equal to or smaller than a given number h, that is, the number of intermediate nodes being equal to or smaller than (h−1). With the Rajapopalan's analysis, it is difficult to calculate the probability of network connection of such a network system. Furthermore, in the Rajapopalan's analysis, the positions of nodes are assumed to be random (uniform). It is thus difficult to apply the method according to the Rajapopalan's analysis to a network system in which node positions are known.

The calculation device 100 according to the first embodiment acquires the probability with which first and second terminals 13 included in the network system 1 are capable of direct connection and the probability with which one base station and the second terminal included in the network system 1 are capable of direct connection. Subsequently, the calculation device 100 calculates the probability with which one base station and the second terminal can connect with each other with a hop count (h−1) and the probability with which the first and second terminals can directly connect with each other by using the acquired probabilities. The calculation device 100 then calculates the probability with which the first terminal can connect with at least one base station included in the network system 1 with the hop count h. Thus, when a positive integer h is given, the connection probability of the network system 1 including a plurality of base stations 12 and a plurality of terminals 13 can be calculated.

Second Embodiment

Figure 10:
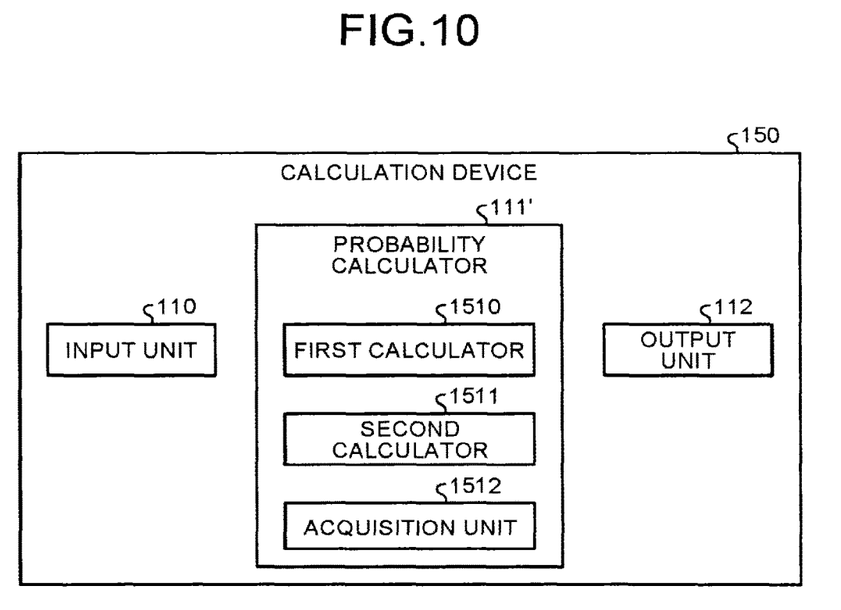
FIG. 10 is a functional block diagram illustrating functions of a calculation device applicable to a second embodiment.

Next, a second embodiment will be described. In the second embodiment, the probability $P^h_{Sj}$ is calculated by calculation through procedures different from those in the first embodiment described above. FIG. 10 is a functional block diagram illustrating functions of a calculation device 150 applicable to the second embodiment. In FIG. 10, the calculation device 150 includes an input unit 110, a probability calculator 111', and an output unit 112. Note that the input unit 110 and the output unit 112 of these components are the same as those in FIG. 5 described above, and detailed description thereof will therefore not be repeated.

The probability calculator 111' includes a first calculator 1510 and a second calculator 1511 configured to perform predetermined first and second calculations, respectively, and an acquisition unit 1512 configured to acquire information used in the first calculator 1510 and the second calculator 1511. The probability calculator 111' acquires information at the acquisition unit 1512 on the basis of various data input to the input unit 110, and performs calculations, which will be described later, at the first calculator 1510 and the second calculator 1511 to obtain the aforementioned probability $P^h_{Sj}$.

In the calculation device 150, the probability calculator 111' is implemented by a calculation program running on the CPU. Alternatively, the probability calculator 111' may be implemented by hardware. The calculation program for implementing the probability calculator 111' may include at least one or more of the functions of the input unit 110 and the output unit 112.

Figure 11:
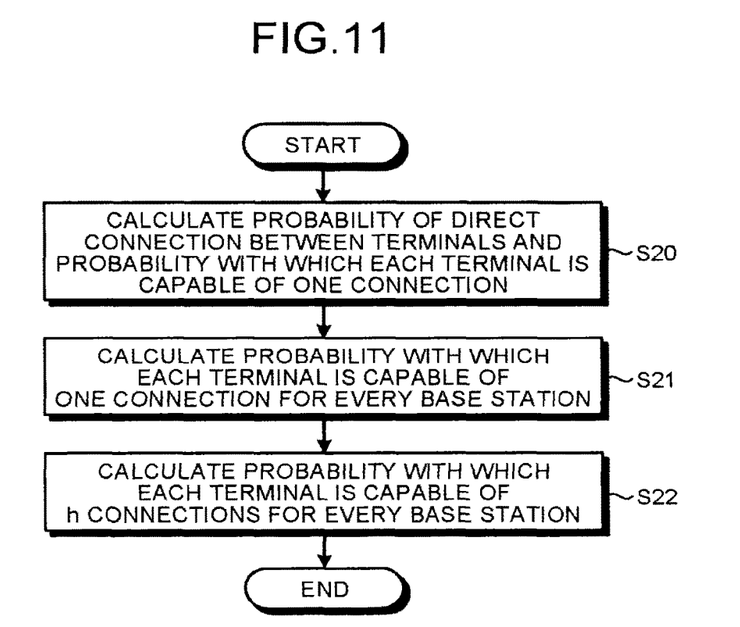
FIG. 11 is an exemplary flowchart illustrating calculation procedures according to the second embodiment.

FIG. 11 is an exemplary flowchart illustrating calculation procedures executed by the probability calculator 111' of the calculation device 150 according to the second embodiment. It is assumed that a maximum hop count h is given to the probability calculator 111' before execution of the flowchart.

In step S20, the acquisition unit 1512 acquires the probability of direct connection between terminals 13 and the probability with which one connection is possible between each terminal 13 and each base station 12 included in the network system 1 similarly to step S10 in the flowchart of FIG. 6 described above.

Subsequently, in step S21, the first calculator 1510 calculates a probability $P^1_{Sj}$ with which each terminal 13 is capable of one connection with at least one of all the base stations 12 included in the network system 1 by using the probability of direct connection between nodes acquired by the acquisition unit 1512 in step S20. In this process, the first calculator 1510 calculates the connection probability $P^1_{Sj}$ according to the following Equation (13) similarly to Equation (10) described above.

$$P^1_{Sj} = 1 - \prod_{1 \le l \le m} (1 - P^1_{Bl, Sj}) \qquad (13)$$

In the next step S22, the second calculator 1511 calculates the connection probability $P^h_{Sj}$ with which each terminal Sj is capable of h connections with each base station 12 as a first probability by using the probability $P^1_{Sj}$ calculated by the first calculator 1510 in step S21 and a connection probability $P^{h-1}_{Sk}$ with which each terminal 13 is capable of (h−1) connections with at least one of all the base stations 12. In this process, the second calculator 1511 calculates the connection probability $P^h_{Sj}$ that is a second probability according to the following Equation (14) similarly to the aforementioned Expression (7).

$$P^h_{Sj} = 1 - \prod_{1 \le k \le n} (1 - P^{h-1}_{Sk} \cdot P^1_{Sk, Sj}) \qquad (14)$$

Specifically, the second calculator 1511 calculates the connection probability with which a base station Bi and a terminal Sj are capable of h connections when a terminal Sk is passed through by obtaining a product of a probability $P^1_{Sk, Sj}$ of direct connection between the terminal Sj and the terminal Sk and a probability $P^{h-1}_{Sk}$ of (h−1) connections of the terminal Sk with the base station 12. The second calculator 1511 then calculates the connection probability $P^h_{Sj}$ as the second probability by Equation (14) on the basis of the calculation result.

Note that the probability with which (h−1) connections are possible used in step S22 described above can be obtained by using the connection probability $P^h_{Sj}$ when the hop count h is 2, for example, and sequentially increasing the hop count h.

In the second embodiment, the connectivity of the network system 1 can also be evaluated by using the probability $P^h_{Sj}$ obtained in step S22 similarly to the first embodiment.

Third Embodiment

Next, a third embodiment will be described. In the third embodiment, a rank r that can be set for each of the terminals 13 included in the network system 1 is set by using the calculation in step S22 in the second embodiment described above.

In many routing protocols, a rank is set for each terminal to prevent a loop. A terminal for which a rank is set is then allowed to carry out transmission to terminals with ranks lower than the rank set for the terminal. Specifically, the smallest value of the rank is 1 and ranks sequentially increased therefrom are set for respective terminals.

For example, when terminals A, B, and C are assumed, ranks 1, 2, and 3 are set for the terminals A, B, and C, respectively. The terminal A for which the rank 1 is set can carry out transmission to a base station but cannot carry out transmission to the terminals B and C with higher ranks. The terminal C for which the rank 3 is set can carry out transmission to a base station and can carry out transmission to the terminals A and B with lower ranks.

This means that a terminal for which a higher rank is set can connect with a base station via terminals for which ranks lower than the rank thereof are set. It is thus possible to use the probabilities of connections of terminals with base stations to set higher ranks for terminals with higher probabilities of connections with base stations and set lower ranks for terminals with lower probabilities of connections with base stations. For a more specific example, connection probabilities can be used for setting ranks of terminals in a network system to which a routing protocol based on the RPL (IPv6 Routing Protocol for Low power and Lossy Networks) is applied.

The method for setting ranks according to the third embodiment will be described in more detail. The calculation device 150 can obtain the probability $P^1_{Sj}$ with which each terminal Sj is capable of one connection with a base station 12 by carrying out steps S20 and S21 in the flowchart of FIG. 11.

Figure 12:
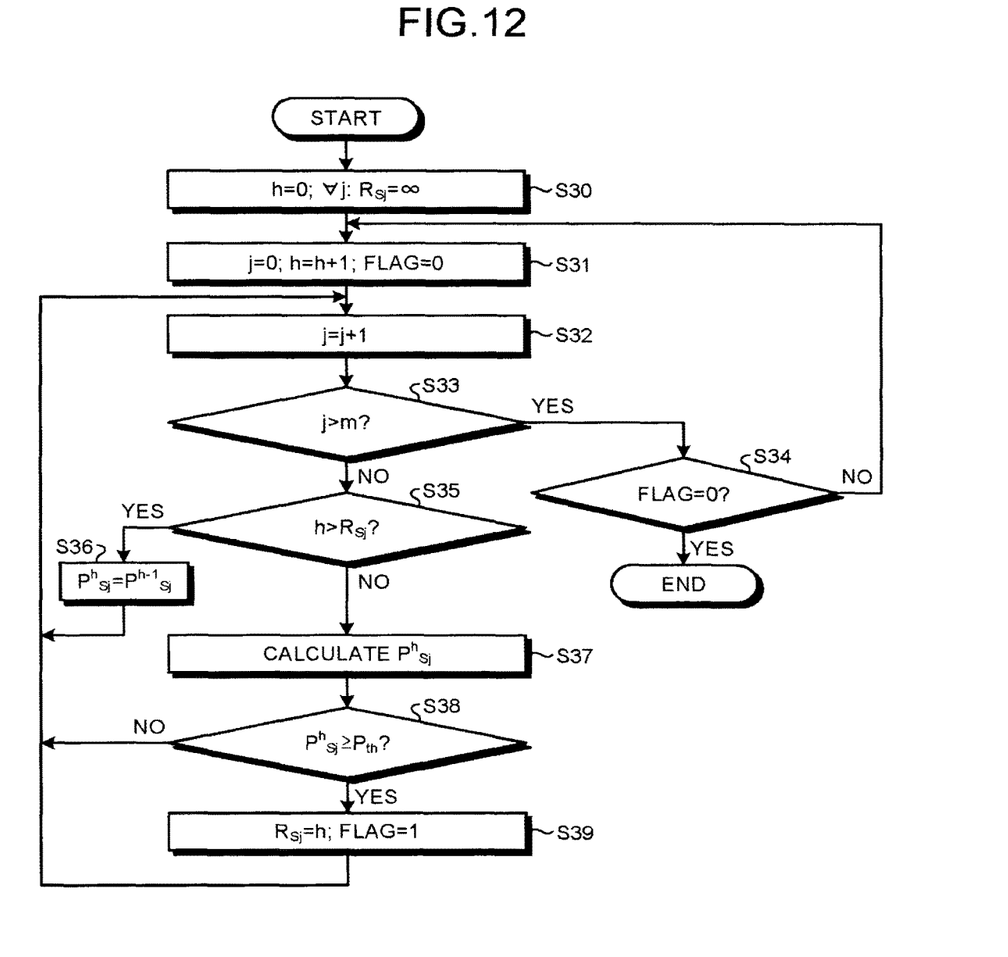
FIG. 12 is a flowchart illustrating an example of a method for setting ranks according to a third embodiment.

FIG. 12 is a flowchart illustrating an example of the method for setting ranks according to the third embodiment. It is assumed that the maximum hop count is given as a value h to the probability calculator 111' before execution of the flowchart. The probability calculator 111' initializes the variable to 0 in step S30. The probability calculator 111' also initializes a variable $R_{Sj}$ for all values of a variable j to infinity in step S30. Here, the variable j represents each terminal Sj and the variable h represents a hop count. In addition, the variable $R_{Sj}$ represents the rank of a terminal Sj.

The probability calculator 111' increments the variable h by 1 and initializes a flag FLAG and the variable j to 0 in step S31. The flag FLAG is used to check whether or not to change the rank of a terminal Sj. In the next step S32, the probability calculator 111' increments the variable j by 1. Subsequently, in the next step S33, the probability calculator 111' determines whether or not the variable j exceeds a value m. The value m is the number of terminals Sj and given in advance. If the variable j is determined to exceed the value m, the probability calculator 111' moves the process to step S34.

In step S34, the probability calculator 111' determines whether or not the value of the flag FLAG is 0, and terminates the process if the value of the flag FLAG is determined to be 0. If the value of the flag FLAG is determined not to be 0, the probability calculator 111' returns the process to step S31, where the probability calculator 111' initializes the variable J to 0 and increments the variable by 1.

If the variable j is determined to be equal to or smaller than the value m in step S33, the probability calculator 111' moves the process to step S35. In step S35, the probability calculator 111' determines whether or not the variable h exceeds the variable $R_{Sj}$ representing the rank of the terminal Sj. If the variable h is determined to exceed the variable $R_{Sj}$, the probability calculator 111' moves the process to step S36. In step S36, the probability calculator 111' sets the probability $P^h_{Sj}$ to a probability $P^{x-1}_{Sj}$, and returns the process to step S32.

If the variable h is determined not to exceed the variable $R_{Sj}$ in step S35, the probability calculator 111' moves the process to step S37. In step S37, the probability calculator 111' calculates the probability $P^h_{Sj}$ for the terminal by using the following expression (15) as explained using Equations (13) and (14) in the second embodiment. Subsequently, in the next step S38, the probability calculator 111' determines whether or not the probability $P^h_{Sj}$ calculated in step S37 is equal to or larger than a threshold $P_{th}$.

$$P^h_{Sj} = 1 - \prod_{R_{Sk} \leq h-1} (1 - P^{h-1}_{Sk} \cdot P^1_{Sk,Sj}) \qquad (15)$$

If the probability $P^h_{Sj}$ is determined to be smaller than the threshold $P_{th}$ in step S38, the probability calculator 111' returns the process to step S32, increments the variable j by 1 and carries out processing on the next terminal Sj. If the probability $P^h_{Sj}$ is determined to be equal to or larger than the threshold $P_{th}$, the probability calculator 111' moves the process to step S39, where the probability calculator 111' sets the rank $R_{Sj}$ of the terminal Sj to the value h and the value of the flag FLAG to 1.

After setting the rank $R_{Sj}$ of the terminal Sj in step S39, the probability calculator 111' returns the process to step S32 and carries out processing on the next terminal Sj.

The probability calculator 111' carries out the processing as described above on all of the terminals Sj included in the network system 1.

As a result of applying the connection probability $P^h_{Sj}$ calculated in the second embodiment to the method for determining ranks in the RPL in this manner, each terminal 13 can carry out routing ensuring the probability of connection with a base station 12 equal to or higher than the threshold $P_{th}$. Furthermore, the connectivity of a network can be evaluated on the basis of the result of setting the routing in the third embodiment similarly to the first example of the application described above.

Hardware Configuration Applicable to Embodiments

Figure 13:
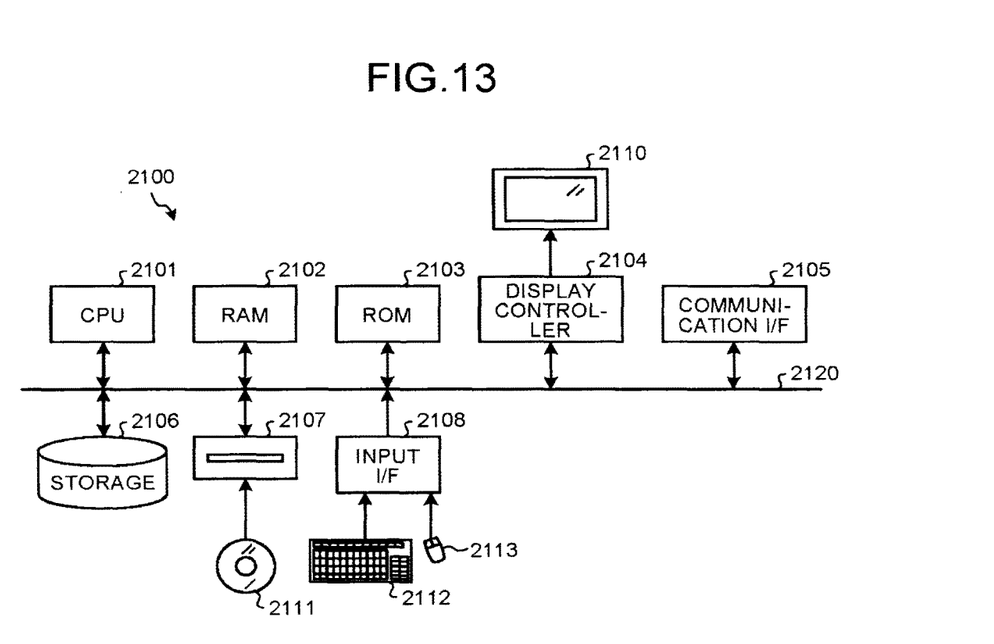
FIG. 13 is a block diagram illustrating an exemplary configuration of a calculation system applicable to the embodiments.

Next, a configuration capable of realizing the calculation devices 100 and 150 according to the embodiments will be described with reference to FIG. 13. As illustrated in FIG. 13, the calculation devices 100 and 150 can be realized by a common computer system 2100. Since the calculation devices 100 and 150 can be realized by similar hardware configurations, the calculation device 100 will be described as representative below to avoid complication.

In FIG. 13, a CPU 2101, a RAM 2102, a ROM 2103, a display controller 2104, and a communication interface (I/F) 2105 are connected to a bus 2120. Furthermore, a storage 2106, a drive unit 2107, and an input I/F 2108 are also connected to the bus 2120.

The CPU 2101 controls the entire computer system 2100 according to programs stored in the ROM 2103 and the storage 2106 by using the RAM 2102 as a working memory. The display controller 2104 converts a display control signal generated by the CPU 2101 into a signal that can be displayed by a display device 2110 and outputs the resulting signal.

The storage 2106 is a nonvolatile semiconductor memory or a hard disk drive, for example, and stores programs to be executed by the CPU 2101 described above, data used by the programs, and the like. The drive unit 2107 can have a removable storage medium 2111 mounted thereon and is at least capable of reading out data from the storage medium 2111. Examples of the storage medium 2111 that can be supported by the drive unit 2107 include a disk recording medium such as a compact disk (CD), a digital versatile disk (DVD), and a flexible disk, and a readable/writable non-volatile semiconductor memory.

The input I/F 2108 inputs data from outside. The input I/F 2108 has a predetermined interface of a universal serial bus (USB), IEEE 1394 (Institute of Electrical and Electronics Engineers 1394) or the like, and inputs data from external devices through the interface. In addition, input devices such as a keyboard 2112 and a mouse 2113 are connected to the input I/F 2108. The user can instruct the computer system 2100 by operating the input devices in response to display on the display device 2110, for example.

The communication I/F 2105 communicates with an external communication network by using a predetermined protocol.

The probability calculator 111 in the calculation device 100 described above is realized by a program running on the CPU 2101. Furthermore, the input unit 110 and the output unit 112 can be realized by programs running on the CPU 2101. Various data, such as data of probabilities of direct connections of the base stations 12 and the terminals 13 included in the network system 1, for calculating the first probability and the second probability described above by the probability calculator 111 are generated, stored in a file, and recorded on the recording medium 2111 by another computer, and supplied to the computer system 2100, for example. Alternatively, data of probabilities of direct connections may be supplied to the computer system 2100 from outside via a network. Data supplied to the computer system 2100 are input to the input unit 110, and stored in the storage 2106 and the RAM 2102, for example.

Calculation programs for executing operation of the calculation device 100 according to the first embodiment, for example, are stored on the computer readable storage medium 2111 such as a CD, a flexible disk (FD), a CD-R or a DVD, which may be provided a computer program product, in a form of a file that can be installed or executed, and provided therefrom. Alternatively, the calculation programs may be stored in the ROM 2103 in advance and provided to the computer system 2100.

Still alternatively, the calculation programs may be stored on a computer connected to a network such as the Internet or a local area network (LAN), and provided to the computer system 2100 by being downloaded via the network. Still alternatively, the calculation programs may be provided or distributed through a network such as the Internet.

The calculation programs according to the first embodiment have a modular structure including the probability calculator 111 described above, for example. In an actual hardware configuration, the CPU 2101 reads the calculation programs from the storage 2106, for example, and executes the programs, whereby the respective units are loaded on the RAM 2102 and the probability calculator 111 is generated on the RAM 2102.

Another Example of Hardware Configuration Applicable to Embodiments

Figure 14:
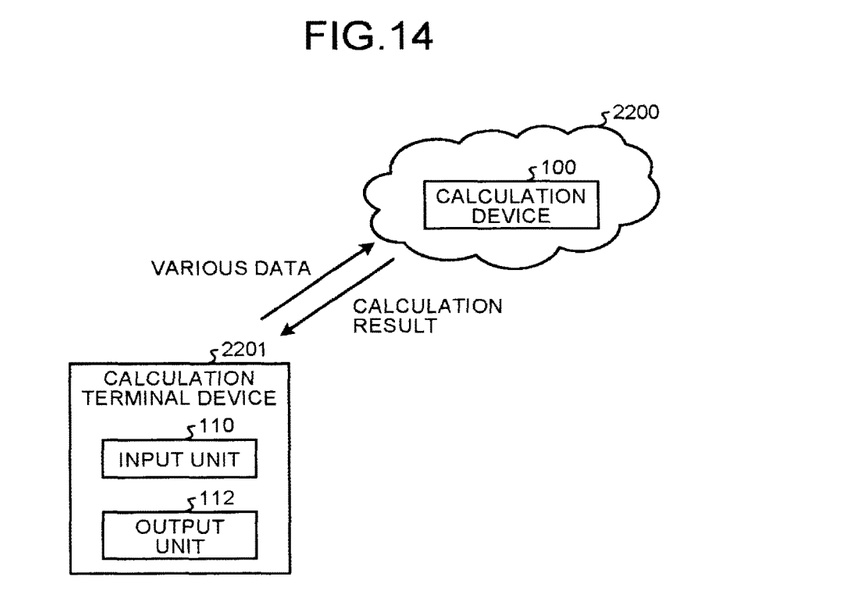
FIG. 14 is a block diagram illustrating another exemplary configuration of a calculation system applicable to the embodiments.

Next, another example of the hardware configuration applicable to the embodiments will be described. This example is an example of a calculation system in which the calculation device 100 according to the first embodiment or the calculation device 150 according to the second embodiment is realized in a network cloud. FIG. 14 illustrates another example of a calculation system applicable to the embodiments. Since the calculation devices 100 and 150 can be realized by similar configurations, the calculation device 100 will be described as representative below to avoid complication. In FIG. 14, components that are the same as those in FIG. 5 described above will be designated by the same reference numerals and detailed description thereof will not be repeated.

In FIG. 14, the calculation system includes the calculation device 100 realized in a network cloud 2200. More specifically, the probability calculator 111 included in the calculation device 100 is realized in the network cloud 2200. The network cloud 2200 is a network group including a plurality of computers connected to one another via a network and being a black box whose inside is hidden and whose input and output are only seen from the outside. The network cloud 2200 uses TCF/IP (Transmission Control Protocol/Internet Protocol) as a communication protocol, for example.

A calculation terminal device 2201 includes a communication I/F for communication with the network cloud 2200, and includes the input unit 110 and the output unit 112. The calculation terminal device 2201 may be a common computer system or may be a dedicated device for the calculation device 100, for example. As described above, the input unit 110 receives as input various data for calculating the first probability and the second probability described above by the probability calculator 111, such as probabilities of direct connections of the base stations 12 and the terminals 13 included in the network system 1. The output unit 112 outputs calculation results transmitted from the network cloud 2200 and results of evaluation of network connectivity based on the calculation results.

In the calculation terminal device 2201, the input unit 110 receives as input data of probabilities of direct connections of the base station 12 and the terminals 13 included in the network system 1, for example. The calculation terminal device 2201 transmits the data of probabilities of direct connections input to the input unit 110 to the network cloud 2200. The data of probabilities of direct connections are passed to the calculation device 100 (the probability calculator 111) in the network cloud 2200.

The calculation device 100 in the network cloud 2200 calculates the probability $P^h_{Sj}$ for each terminal 13 by the probability calculator 111 on the basis of the data of probabilities of direct connections passed thereto. The calculation device 100 then transmits the probability $P^h_{Sj}$ for each terminal 13 obtained by the calculation from the network cloud 2200 to the calculation terminal device 2201. The calculation terminal device 2201 obtains an evaluation value evaluating the connectivity of the network system 1 on the basis of the probability $P^h_{Sj}$ of each terminal 13 received from the network cloud 2200.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation method for performing calculation on a wireless network including a plurality of terminals and a plurality of base stations, the terminals including a first terminal and a second terminal, the base stations including a first base station, the method comprising:

calculating a first probability with which the first base station and the second terminal are capable of connection with (h−1) hops, h being a finite integer equal to or larger than 2, and the first terminal and the second terminal are capable of direct connection with each other, by using a probability with which the first terminal and the second terminal are capable of direct connection with each other and a probability with which the second terminal and the first base station are capable of direct connection with each other, and calculating a second probability with which the first terminal is capable of connection with at least one of the base stations with h hops by using the first probability.

2. The method according to claim 1, further comprising evaluating easiness of connection in the wireless network by using a smallest value of second probabilities for respective terminals.

3. The method according to claim 1, further comprising evaluating easiness of connection in the wireless network by using a value obtained by multiplying second probabilities for respective terminals.

4. A calculation method for performing calculation on a wireless network including a plurality of terminals and a plurality of base stations, the terminals including a first terminal and a second terminal, the base stations including a first base station, the method comprising:

obtaining a probability with which the first terminal is capable of direct connection with at least one of the base stations by using a probability with which the first terminal and the second terminal are capable of direct connection with each other and the second terminal and the first base station are capable of direct connection with each other;

calculating a first probability with which the second terminal is capable of connection with at least one of the base stations with (h−1) hops, h being a finite integer equal to or larger than 2, and the second terminal is capable of direct connection with the first terminal by using the obtained probability; and calculating a second probability with which the first terminal is capable of connection with at least one of the base stations with h hops by using the first probability.

5. The method according to claim 4, further comprising evaluating easiness of connection in the wireless network by using a smallest value of second probabilities for respective terminals.

6. The method according to claim 4, further comprising evaluating easiness of connection in the wireless network by using a value obtained by multiplying second probabilities for respective terminals.

7. The method according to claim 4, further comprising setting a rank for limiting a direction of transmission from each terminal for each of the terminals on a basis of a result of comparison of the second probability with a threshold.

8. The method according to claim 7, wherein the calculating the second probability includes further calculating the second probability that is a probability with which the first terminal is capable of connection with at least one of the base stations with r hops, r being an integer not smaller than 0 and not larger than h and being sequentially incremented one by one, and the setting includes setting a rank to r on a basis of a result of comparison of the first probability with a threshold.

9. A calculation device for performing calculation on a wireless network including a plurality of terminals and a plurality of base stations, the terminals including a first terminal and a second terminal, the base stations including a first base station, the calculation device comprising:

a processor that calculates a first probability with which the first base station and the second terminal are capable of connection with (h−1) hops, h being a finite integer equal to or larger than 2, and the first terminal and the second terminal are capable of direct connection with each other, by using a probability with which the first terminal and the second terminal are capable of direct connection with each other and a probability with which the second terminal and the first base station are capable of direct connection with each other; and calculates a second probability with which the first terminal is capable of connection with at least one of the base stations with h hops by using the first probability.

10. A calculation device for performing calculation on a wireless network including a plurality of terminals and a plurality of base stations, the terminals including a first terminal and a second terminal, the base stations including a first base station, the calculation device comprising:

a processor that obtains a probability with which the first terminal is capable of direct connection with at least one of the base stations by using a probability with which the first terminal and the second terminal are capable of direct connection with each other and the second terminal and the first base station are capable of direct connection with each other, calculates a first probability with which the second terminal is capable of connection with at least one of the base stations with (h−1) hops, h being a finite integer equal to or larger than 2, and the second terminal is capable of direct connection with the first terminal by using the obtained probability, and calculates a second probability with which the first terminal is capable of connection with at least one of the base stations with h hops by using the first probability.

* * * * *